United States Patent
Wang et al.

(10) Patent No.: US 9,426,759 B2
(45) Date of Patent: Aug. 23, 2016

(54) ALIGNING WIRELESS LOCAL AREA NETWORK OPERATIONS WITH POWER HEADROOM REPORTING

(71) Applicant: QUALCOMM Incorporated, San Diego, CA (US)

(72) Inventors: Jibing Wang, San Diego, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 14/486,123

(22) Filed: Sep. 15, 2014

(65) Prior Publication Data

US 2016/0081044 A1    Mar. 17, 2016

(51) Int. Cl.
| | |
|---|---|
| H04W 24/00 | (2009.01) |
| H04W 80/04 | (2009.01) |
| H04W 84/12 | (2009.01) |
| H04W 52/36 | (2009.01) |
| H04W 24/10 | (2009.01) |
| H04W 52/24 | (2009.01) |
| H04W 52/38 | (2009.01) |
| H04W 88/06 | (2009.01) |

(52) U.S. Cl.
CPC ........... *H04W 52/365* (2013.01); *H04W 24/10* (2013.01); *H04W 52/243* (2013.01); *H04W 52/38* (2013.01); *H04W 88/06* (2013.01); *H04W 84/12* (2013.01)

(58) Field of Classification Search
CPC ... H04W 72/04; H04W 88/08; H04W 36/04; H04W 24/00; H04W 52/146; H04W 52/242; H04W 80/04
See application file for complete search history.

(56) References Cited

U.S. PATENT DOCUMENTS

| | | | | |
|---|---|---|---|---|
| 9,002,391 B1 * | 4/2015 | Goyal | ................. | H04W 52/242 455/512 |
| 2011/0159911 A1 * | 6/2011 | Chen | .................. | H04W 52/221 455/522 |
| 2011/0319112 A1 * | 12/2011 | Jeong | .................. | H04W 52/146 455/509 |

(Continued)

FOREIGN PATENT DOCUMENTS

| | | |
|---|---|---|
| EP | 2663113 A1 | 11/2013 |
| WO | WO-2012021879 A2 | 2/2012 |

OTHER PUBLICATIONS

Astely et al., "LTE: The Evolution of Mobile Broadband", LTE Part II: 3GPP Release 8, IEEE Communication Magazine, Apr. 2009, 8 pages.

(Continued)

*Primary Examiner* — Andrew Lee
(74) *Attorney, Agent, or Firm* — Holland & Hart LLP

(57) ABSTRACT

Methods, systems, apparatuses, and devices are described for aligning wireless local area network (WLAN) operations with reporting of transmit power information via a cellular network. A mobile device may identify information to be communicated for a WLAN operations. The mobile device may determine a reporting schedule for transmit power information to a serving base station of the cellular network. The information may be communicated on a schedule determined based on the reporting schedule for transmit power information. The information communicated for the WLAN operation may be communicated between subsequent reporting instances for the transmit power information.

30 Claims, 11 Drawing Sheets

(56) References Cited

U.S. PATENT DOCUMENTS

| | | | |
|---|---|---|---|
| 2012/0008552 A1* | 1/2012 | Baldemair | H04W 52/146 370/328 |
| 2012/0083264 A1* | 4/2012 | Ramasamy | H04W 52/262 455/425 |
| 2012/0184221 A1* | 7/2012 | Jung | H04W 24/10 455/67.11 |
| 2012/0201134 A1* | 8/2012 | Wang Helmersson | H04W 52/146 370/230 |
| 2013/0016635 A1 | 1/2013 | Linsky et al. | |
| 2013/0064111 A1 | 3/2013 | Linsky et al. | |
| 2013/0201892 A1 | 8/2013 | Holma et al. | |
| 2013/0225223 A1* | 8/2013 | Nukala | H04W 52/241 455/522 |
| 2013/0316758 A1 | 11/2013 | Uchino et al. | |
| 2014/0036786 A1* | 2/2014 | Kazmi | H04W 52/146 370/329 |
| 2014/0036827 A1 | 2/2014 | Han et al. | |
| 2014/0135054 A1* | 5/2014 | Chiou | H04W 52/146 455/522 |
| 2015/0201319 A1* | 7/2015 | Deng | H04W 48/16 455/452.1 |
| 2015/0358920 A1* | 12/2015 | Sorrentino | H04W 52/146 455/522 |
| 2015/0373601 A1* | 12/2015 | Benjebbour | H04W 36/04 370/252 |

OTHER PUBLICATIONS

ISA/EPO, International Search Report and Written Opinion of the International Searching Authority, Int'l. App. No. PCT/US2015/045193, Oct. 19, 2015, European Patent Office, Rijswijk, NL 9 pgs.

\* cited by examiner

ALIGNING WIRELESS LOCAL AREA NETWORK OPERATIONS WITH POWER HEADROOM REPORTING

BACKGROUND

1. Field of the Disclosure

The present disclosure relates to wireless communication systems, and more particularly to aligning wireless location area network operations with power headroom reporting over a wide area network.

2. Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network (IEEE 802.11) may include an access point (AP) that may communicate with stations (STAs) or mobile devices. The AP may be coupled to a network, such as the Internet, and enable a mobile device to communicate via the network (and/or communicate with other devices coupled to the access point). Other examples of such multiple-access systems include code-division multiple access (CDMA) systems, time-division multiple access (TDMA) systems, frequency-division multiple access (FDMA) systems, and orthogonal frequency-division multiple access (OFDMA) systems. The systems may include a base station communicating with mobile devices.

In conventional cellular communications systems, e.g., long term evolution (LTE) systems, a transmit power of a mobile device is normally controlled by the base station. However, there may be times when the mobile device independently reduces its transmit power and reports its modified transmit power limit to the base station so that the base station is aware of the reduced transmit power limit for the base station. Otherwise, the base station may assume, for example, that the mobile device can transmit with full power and schedule the mobile device to transmit with a wider bandwidth and/or using a modulation coding scheme (MCS) that requires full power. The mobile device may inform the base station of its power limit via a power headroom (PHR) report. Generally, the base station determines how often and at which instance the mobile device is allowed to transmit its PHR report.

One reason a mobile device may reduce its transmit power is to avoid interference between multiple radios on the mobile device. Multiple radios (e.g., an LTE radio and a WLAN radio) on the same mobile device can interfere with each other causing severely degraded performance. For example, LTE operations may interfere with WLAN scan/connection setup (such as association), data transmission and the like, and therefore negatively impact user experience. To help reduce such interference, the mobile device may reduce its LTE transmit power during WLAN operations. This may be referred to as transmit power backoff or reduction. Currently, transmit power backoff or reduction during WLAN operations is not aligned with mobile device PHR report transmissions.

SUMMARY

The described features generally relate to various improved systems, methods, and/or apparatuses for wireless communications. Such systems, methods, and/or apparatuses may provide for aligning operations over a first radio access network (RAN), e.g., a WLAN, with scheduled reporting periods for transmit power information over a second RAN, e.g., a WAN. Generally, a mobile device may determine that information is to be communicated over the first RAN. The information may include messages associated with discovery/association operations via a WLAN, for example. The mobile device may then determine the schedule associated with reporting its transmit power information via a second RAN. The transmit power information may be a PHR communicated to a serving base station, for example. The mobile device may schedule the communication of the information via the first RAN based on the schedule for reporting the transmit power information to the second RAN. In some examples, the mobile device may communicate the information via sub-blocks of data where a sub-block of data is sent between subsequent occurrences of transmit power reporting.

In a first illustrative set of examples, a method for wireless communication is provided. The method may include: identifying information to be communicated via a first radio access network (RAN); determining a schedule for reporting transmit power information to a second RAN; and scheduling the communication of the information via the first RAN to occur based at least in part on the schedule for reporting the transmit power information to the second RAN.

In some aspects, the method may include scheduling the communication of the information via the first RAN to occur between subsequent instances of reporting the transmit power information to the second RAN. The method may include: dividing the information to be communicated via the first RAN into at least one communication sub-block; and scheduling the communication of the at least one communication sub-block to occur between subsequent instances of reporting the transmit power information to the second RAN.

In some aspects, the method may include: receiving an indication via the first RAN that information is to be communicated; sending a message, via the first RAN, comprising information indicative of the schedule for reporting transmit power information to the second RAN; and receiving the information via the first RAN on a schedule based at least in part on the schedule for reporting transmit power information to the second RAN. The information indicative of the schedule for reporting transmit power information to the second RAN may include at least one of a reporting start time, a reporting interval, or combinations thereof.

In some aspects, the method may include: receiving an indication via the first RAN that information is to be communicated; sending a message, via the first RAN, comprising information indicative of the schedule for reporting transmit power information to the second RAN; and receiving the information, via the first RAN, during at least one communication interval, wherein the at least one communication interval is based at least in part on the schedule for reporting transmit power information to the second RAN.

In some aspects, the method may include: sending a message via the second RAN, the message comprising information indicative of a schedule for communicating the information via the first RAN; and receiving, via the second RAN, an updated schedule for reporting the transmit power information to the second RAN, wherein the updated schedule is based at least in part on the schedule for communicating the information via the first RAN. The first RAN may be a wireless local area network (WLAN) and the second RAN may be a cellular communications network.

In some aspects, the transmit power information may be reported to the second RAN in a power headroom report. The transmit power information reported to the second RAN may include at least one of a transmit power associated with communications via the first RAN, a transmit power associated with communications via the second RAN, or combinations thereof. The power headroom report may include a power backoff indicator.

In some aspects, the information to be communicated via the first RAN may include at least one of an information associated with a scan interval, an association request message, an association response message, data to be transmitted, or combinations thereof.

In a second set of illustrative examples, an apparatus for wireless communications is provided. The apparatus may include: a processor; memory in electronic communication with the processor; and instructions being stored in the memory, the instructions being executable by the processor. The instructions may be executable by the processor to: identify information to be communicated via a first radio access network (RAN); determine a schedule for reporting transmit power information to a second RAN; and schedule the communication of the information via the first RAN to occur based at least in part on the schedule for reporting the transmit power information to the second RAN.

In some aspects, the apparatus may include instructions executable by the processor to schedule the communication of the information via the first RAN to occur between subsequent instances of reporting the transmit power information to the second RAN. The apparatus may include instructions executable by the processor to: divide the information to be communicated via the first RAN into at least one communication sub-block; and schedule the communication of the at least one communication sub-block to occur between subsequent instances of reporting the transmit power information to the second RAN.

In some aspects, the apparatus may include instructions executable by the processor to: receive an indication via the first RAN that information is to be communicated; send a message, via the first RAN, comprising information indicative of the schedule for reporting transmit power information to the second RAN; and receive the information via the first RAN on a schedule based at least in part on the schedule for reporting transmit power information to the second RAN. The information indicative of the schedule for reporting transmit power information to the second RAN may include at least one of a reporting start time, a reporting interval, or combinations thereof.

In some aspects, the apparatus may include instructions executable by the processor to: receive an indication via the first RAN that information is to be communicated; send a message, via the first RAN, comprising information indicative of the schedule for reporting transmit power information to the second RAN; and receive the information, via the first RAN, during at least one communication interval, wherein the at least one communication interval is based at least in part on the schedule for reporting transmit power information to the second RAN.

In some aspects, the apparatus may include instructions executable by the processor to: send a message via the second RAN, the message comprising information indicative of a schedule for communicating the information via the first RAN; and receive, via the second RAN, an updated schedule for reporting the transmit power information to the second RAN, wherein the updated schedule is based at least in part on the schedule for communicating the information via the first RAN. The first RAN may be a wireless local area network (WLAN) and the second RAN may be a cellular communications network.

In some aspects, the transmit power information may be reported to the second RAN in a power headroom report. The transmit power information reported to the second RAN may include at least one of a transmit power associated with communications via the first RAN, a transmit power associated with communications via the second RAN, or combinations thereof. The power headroom report may include a power backoff indicator. The information to be communicated via the first RAN may include at least one of an information associated with a scan interval, an association request message, an association response message, data to be transmitted, or combinations thereof.

In a third set of illustrative examples, an apparatus for wireless communications is provided. The apparatus may include: means for identifying information to be communicated via a first radio access network (RAN); means for determining a schedule for reporting transmit power information to a second RAN; and means for scheduling the communication of the information via the first RAN to occur based at least in part on the schedule for reporting the transmit power information to the second RAN.

In some aspects, the apparatus may include means for scheduling the communication of the information via the first RAN to occur between subsequent instances of reporting the transmit power information to the second RAN. The apparatus may include: means for dividing the information to be communicated via the first RAN into at least one communication sub-block; and means for scheduling the communication of the at least one communication sub-block to occur between subsequent instances of reporting the transmit power information to the second RAN.

In some aspects, the apparatus may include: means for receiving an indication via the first RAN that information is to be communicated; means for sending a message, via the first RAN, comprising information indicative of the schedule for reporting transmit power information to the second RAN; and means for receiving the information via the first RAN on a schedule based at least in part on the schedule for reporting transmit power information to the second RAN.

In a further set of illustrative examples, a non-transitory computer-readable medium storing computer executable code for wireless communications is provided. The code may be executable by a processor to: identify information to be communicated via a first radio access network (RAN); determine a schedule for reporting transmit power information to a second RAN; and schedule the communication of the information via the first RAN to occur based at least in part on the schedule for reporting the transmit power information to the second RAN.

In some aspects, the non-transitory computer-readable medium may include code executable by the processor to: schedule the communication of the information via the first RAN to occur between subsequent instances of reporting the transmit power information to the second RAN.

The foregoing has outlined rather broadly the features and technical advantages of examples according to the disclosure so that the detailed description that follows may be better understood. Additional features and advantages will be described hereinafter. The conception and specific examples disclosed may be readily utilized as a basis for modifying or designing other structures for carrying out the same or similar purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Currently, a serving base station controls the timing of transmission of transmit power information from a mobile device over a cellular RAN. For a multi-access mobile device communicating on different RANs (e.g., cellular and WLAN), a change in transmit power on one RAN may impact capabilities and/or performance for communications occurring on the second RAN. For example, a mobile device changing its transmit power for communications via the WLAN RAN may have less transmit power headroom available for communications via the cellular RAN. Accordingly, the serving base station may be unaware of the change in transmit power headroom when the WLAN transmit power is adjusted between instances of transmit power reporting and may, therefore, be unaware of the operational capabilities of the mobile device, e.g., throughput capacity, etc. Currently, there is no mechanism to align operations over the WLAN RAN with the power headroom reporting via the cellular RAN.

Aspects of the present disclosure relate to aligning WLAN operations with the transmission of mobile device power headroom reports. When WLAN operations and any corresponding transmit power backoff are aligned with PHR reporting during the WLAN operations, the base station is aware of the mobile device's reduced transmit power limit and the base station can schedule LTE transmission with the mobile device accounting for the mobile device transmit power backoff. The timing and/or duration of the WLAN operations may be modified to be aligned between PHR reporting events. In some aspects, the WLAN operations may start immediately after a PHR report is submitted and conclude at or immediately before a subsequent PHR report is submitted. Thus, the mobile device's PHR report accurately reflects the mobile device power limits for time intervals that immediately follow each PHR report.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
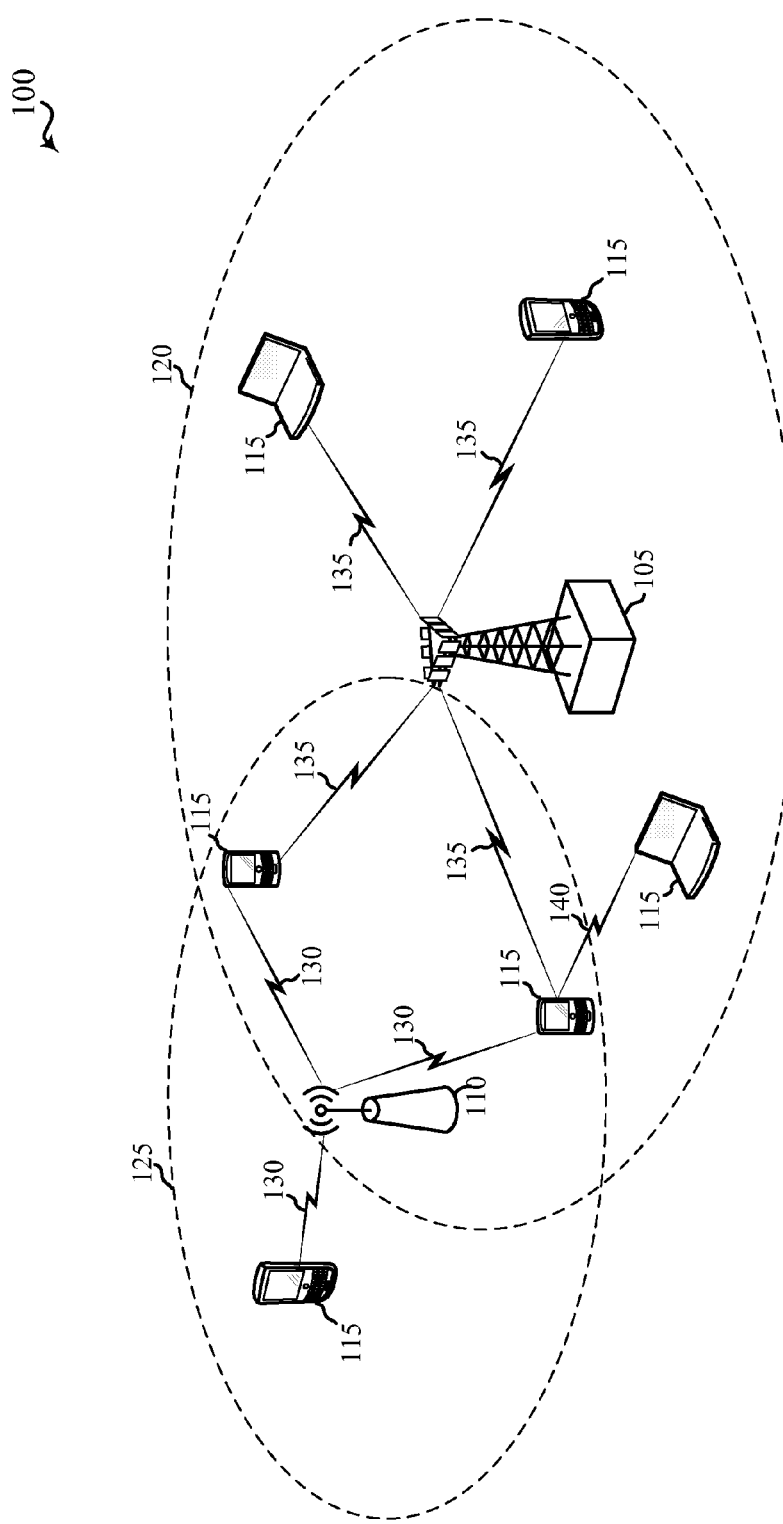
FIG. 1 shows a block diagram of a wireless communication system, in accordance with various aspects of the present disclosure.

Referring first to FIG. 1, a block diagram illustrates an example of a wireless communication system 100. The wireless communication system 100 may include base station(s) 105, access point(s) (AP) 110, and mobile devices 115. The AP 110 may provide wireless communications via a WLAN RAN such as, e.g., a network implementing at least one of the IEEE 802.11 family of standards. Each AP 110 has a geographical coverage area 125 such that mobile devices 115 within that area can typically communicate with the AP 110. Mobile devices 115 may be multi-access mobile devices that communication with the AP 110 and the base station 105 via different radio access networks. The mobile devices 115, such as mobile stations, personal digital assistants (PDAs), other handheld devices, netbooks, notebook computers, tablet computers, laptops, display devices (e.g., TVs, computer monitors, etc.), printers, etc., may be stationary or mobile and traverse the geographical coverage areas 120 and/or 125. While only one base station 105 and AP 110 is illustrated, the wireless communication system 100 may have multiple base stations 105 and/or APs 110. Some or all of the mobile devices 115, which may also be referred to as mobile stations (MSs), access terminals (ATs), user equipment (UE), subscriber stations (SSs), or subscriber units, may associate and communicate with an AP 110 via a communication link 130 and/or with a base station 105 via a communication link 135.

Although not shown in FIG. 1, a mobile device 115 can be covered by more than one AP 110 and can therefore associate with multiple APs 110 at different times. A single AP 110 and an associated set of stations may be referred to as a basic service set (BSS). An extended service set (ESS)

is a set of connected BSSs. A distribution system (DS) (not shown) is used to connect APs 110 in an extended service set. A geographical coverage area 125 for an access point 110 may be divided into sectors making up only a portion of the coverage area (not shown). The wireless communication system 100 may include APs 110 of different types (e.g., metropolitan area, home network, etc.), with varying sizes of coverage areas and overlapping coverage areas for different technologies. Although not shown, other wireless devices can communicate with the AP 110.

While the mobile devices 115 may communicate with each other through the AP 110 using communication links 130, each mobile device 115 may also communicate directly with other mobile device 115 via a direct wireless link 140. Two or more mobile devices 115 may communicate via a direct wireless link 140 when both mobile devices 115 are in the AP 110 geographical coverage area 125 or when one or neither mobile device 115 is within the AP 110 geographical coverage area 125. Examples of direct wireless links 140 may include Wi-Fi Direct connections, connections established by using a Wi-Fi Tunneled Direct Link Setup (TDLS) link, and other P2P group connections. The mobile devices 115 in these examples may communicate according to the WLAN radio and baseband protocol including physical and MAC layers from IEEE 802.11, and its various versions including, but not limited to, 802.11b, 802.11g, 802.11a, 802.11n, 802.11ac, 802.11ad, 802.11ah, etc. In other implementations, other peer-to-peer connections and/or ad hoc networks may be implemented within a WLAN network.

The base stations 105 may wirelessly communicate with the mobile devices 115 via base station antennas. Each base station 105 may provide communication coverage for a respective geographical coverage area 120. In some examples, base stations 105 may be referred to as a base transceiver station, a radio base station, an access point, a radio transceiver, a NodeB, eNodeB (eNB), Home NodeB, a Home eNodeB, or some other suitable terminology. The geographical coverage area 120 for a base station 105 may be divided into sectors making up only a portion of the coverage area (not shown). The wireless communication system 100 may include base stations 105 of different types (e.g., macro and/or small cell base stations). There may be overlapping geographic coverage areas 120/125 for different technologies.

In some examples, the wireless communication system 100 includes portions of an LTE/LTE-A network. In LTE/LTE-A networks, the term evolved Node B (eNB) may be generally used to describe the base stations 105, while the term UE may be generally used to describe the mobile devices 115. The wireless communication system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a mobile devices 115 and the base stations 105 or core network supporting radio bearers for the user plane data. At the Physical (PHY) layer, the transport channels may be mapped to Physical channels.

The mobile devices 115 are dispersed throughout the wireless communication system 100, and each mobile device 115 may be stationary or mobile. A mobile device 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A mobile device 115 may be a cellular phone, a personal digital assistant (PDA), a wireless modem, a wireless communication device, a handheld device, a tablet computer, a laptop computer, a cordless phone, a wireless local loop (WLL) station, or the like. A mobile device 115 may be able to communicate with various types of base stations and network equipment including macro eNBs, small cell eNBs, relay base stations, APs, and the like.

The communication links 135 shown in wireless communication system 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. Each communication link 135 may include at least one carrier, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 135 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communication system 100, base stations 105, APs 110, and/or mobile devices 115 may include multiple antennas for employing antenna diversity schemes to improve communication quality and reliability between base stations 105, APs 110, and mobile devices 115. Additionally or alternatively, base stations 105, APs 110, and/or mobile devices 115 may employ multiple-input, multiple-output (MIMO) techniques that may take advantage of multi-path environments to transmit multiple spatial layers carrying the same or different coded data.

Wireless communication system 100 may support time alignment of various WLAN operations with power headroom reporting instances. In some examples, base stations 105, APs 110, and/or mobile devices 115 may schedule, modify, or otherwise consider communications via a WLAN, for example, based on transmit power limits reporting via a cellular network, for example. A mobile device 115 may determine that there is information to communicate via the WLAN and determine the schedule associated with reporting transmit power headroom information via the cellular network. The mobile device 115 may determine a schedule for communicating the information via the WLAN that considers or otherwise aligns with the schedule for reporting the transmit power headroom information. Accordingly, the mobile device 115 and base station 105 may know the transmit power available for cellular communications while WLAN communications are ongoing.

Figure 2:
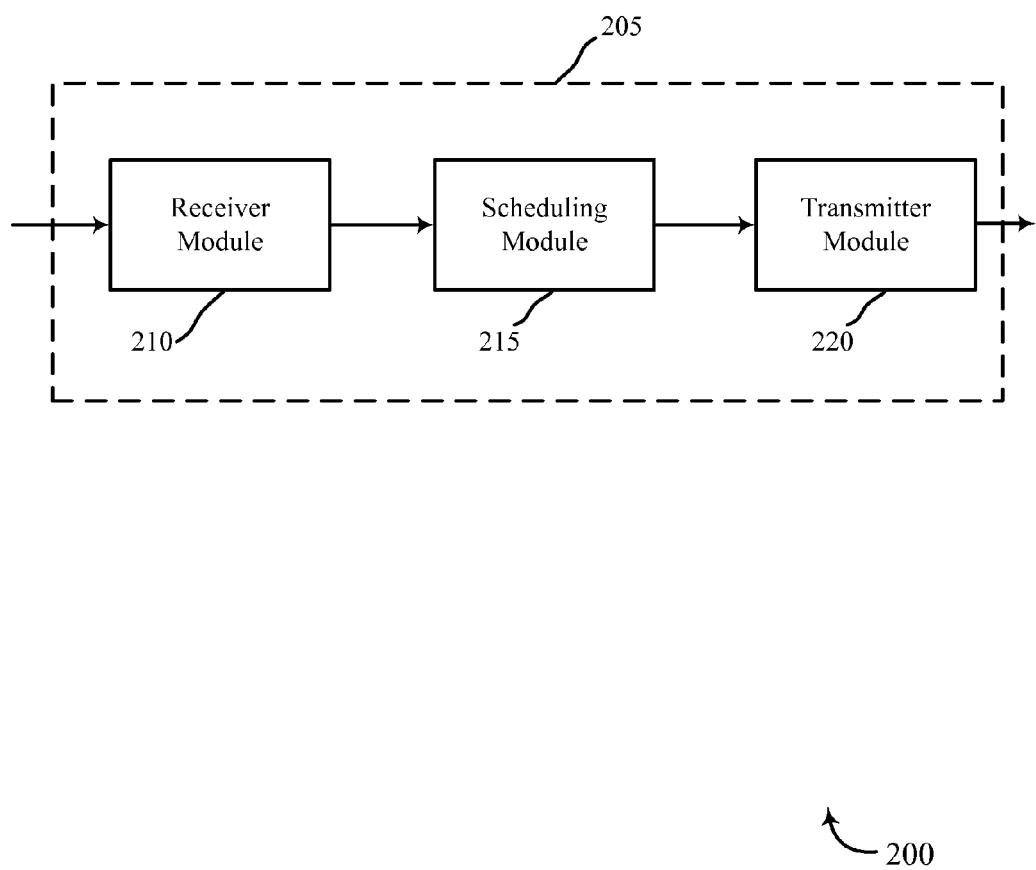
FIG. 2 shows a block diagram of a device for use in wireless communication, in accordance with various aspects of the present disclosure.

FIG. 2 shows a block diagram 200 of an apparatus 205 for use in a mobile device for wireless communication, in accordance with various aspects of the present disclosure. In some examples, the apparatus 205 may be an example of aspects of at least one of the mobile devices 115 described with reference to FIG. 1. The apparatus 205 may also be or include a processor (not shown). The apparatus 205 may include a receiver module 210, a scheduling module 215, and/or a transmitter module 220. Each of these modules may be in communication with each other.

The apparatus 205, through the receiver module 210, the scheduling module 215, and/or the transmitter module 220, may perform functions described herein. For example, the apparatus 205 may align WLAN operations with transmit power headroom reporting instances. The apparatus 205 may determine that there is information to be communicated via the WLAN. The apparatus 205 may determine the schedule for reporting the transmit power headroom information via the cellular network. Accordingly, the apparatus 205 may schedule communicating the information via the WLAN to occur based on the reporting schedule for transmit power headroom information via the cellular network. In some examples, the apparatus 205 may schedule the information to be communicated via the WLAN such that it is communicated during a time period that does not overlap with a transmit power headroom information instance. In some examples, the apparatus 205 may schedule the information to be communicated via the WLAN by dividing the information into sub-blocks and scheduling each sub-block to be communicated between reporting instances for transmit power headroom information.

The components of the apparatus 205 may, individually or collectively, be implemented using ASICs adapted to perform some or all of the applicable functions in hardware. Alternatively, the functions may be performed by other processing units (or cores), on integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by general or application-specific processors.

The receiver module 210 may receive information such as packets, user data, and/or control information associated with various information channels (e.g., control channels, data channels, etc.). The receiver module 210 may include two receiver chains, in some examples, and may receive messages via a WLAN and a cellular network, i.e., multi-access. For example, the receiver module 210 may receive messages via the WLAN associated with WLAN operations, e.g., discovery/association operations. The receiver module 210 may also receive messages via the cellular network associated with transmit power control information, e.g., backoff operations, etc. Information may be passed on to the scheduling module 215 and to other components of the apparatus 205.

The scheduling module 215 may determine a schedule for WLAN operations that considers and/or otherwise accounts for reporting instances of transmit power headroom information via a cellular network. The scheduling module 215 may determine that there is information to be communicated via the WLAN and schedule the information to be communicated based on a reporting schedule for the transmit power headroom information provided by a base station. The scheduling module 215 may schedule the WLAN operation (e.g., scan/association etc.) to occur such that information is communicated between the transmit power headroom reporting instances to ensure the base station is aware of the apparatus 205 reduced transmit power limit so that the base station can schedule LTE transmission with the apparatus 205 taking into account of apparatus 205's transmit power limit. Thus, packet dropping and network time/frequency resource loss can be avoided or minimized because the base station is aware of when the transmit power backoff is occurring at apparatus 205.

The transmitter module 220 may transmit the signals received from other components of the apparatus 205. The transmitter module 220 may transmit signals via a WLAN and a cellular network, i.e., multi-access. The transmitter module 220 may transmit messages via the WLAN associated with various WLAN operations, e.g., discovery, association, etc. The transmitter module 220 may transmit messages via the cellular network associated with transmit power headroom reporting. In some examples, the transmitter module 220 may be collocated with the receiver module 210 in a transceiver module. The transmitter module 220 may include a single antenna, or it may include a plurality of antennas.

Figure 3:
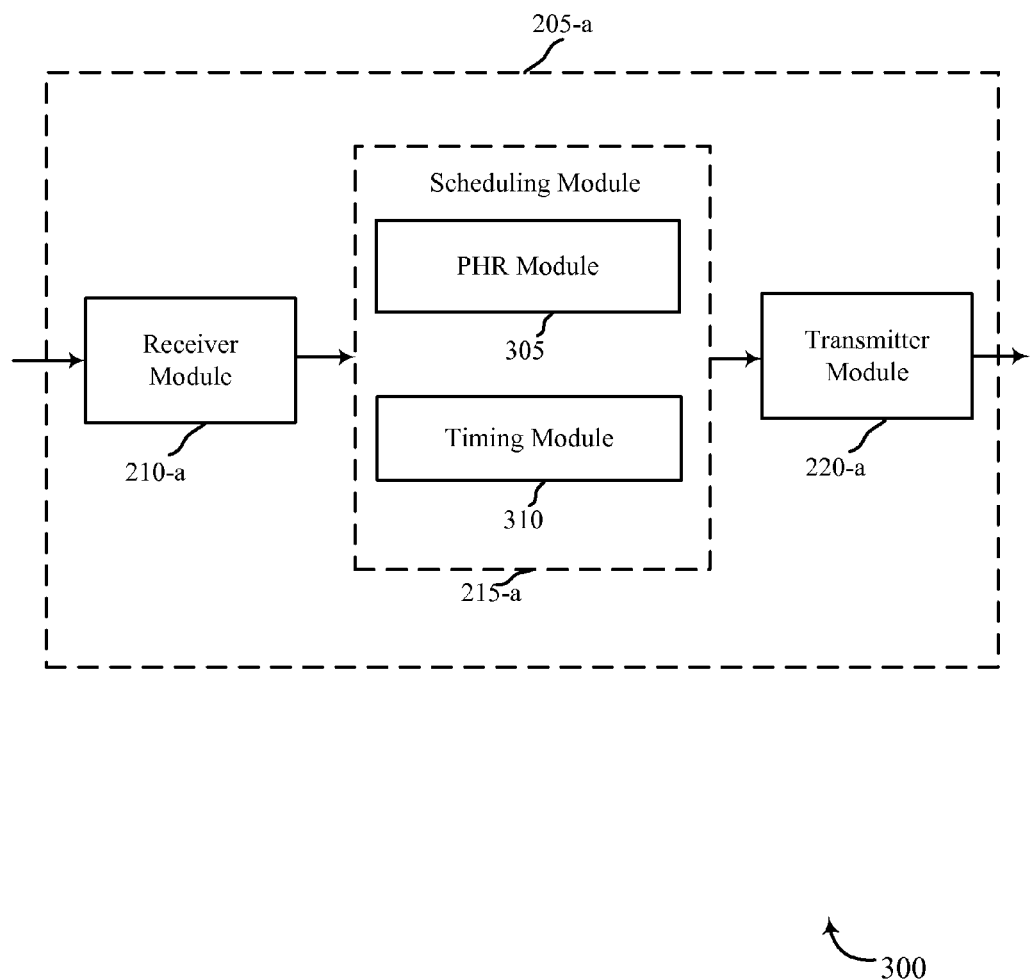
FIG. 3 shows a block diagram of a device for use in wireless communication, in accordance with various aspects of the present disclosure.

FIG. 3 shows a block diagram 300 of an apparatus 205-a that is used in a mobile device for wireless communication, in accordance with various examples. The apparatus 205-a may be an example of aspects of a mobile device 115 described with reference to FIG. 1. It may also be an example of an apparatus 205 described with reference to FIG. 2. The apparatus 205-*a* may include a receiver module 210-*a*, a scheduling module 215-*a*, and/or a transmitter module 220-*a*, which may be examples of the corresponding modules of apparatus 205. The apparatus 205-*a* may also include a processor (not shown). Each of these modules may be in communication with each other. The scheduling module 215-*a* may include a power headroom reporting (PHR) module 305 and a timing module 310. The receiver module 210-*a* and the transmitter module 220-*a* may perform the functions of the receiver module 210 and the transmitter module 220 of FIG. 2, respectively.

The PHR module 305 may manage aspects of reporting transmit power headroom information for the apparatus 205-*a*. The PHR module 305 may, in cooperation with the transmitter module 220-*a*, control, monitor, or otherwise determine the transmit power of the apparatus 205-*a* for communications via the WLAN and/or the cellular network. The PHR module 305 may determine the available transmit power headroom for the apparatus based on the current transmit power and a maximum transmit power the apparatus 205-*a* supports. The PHR module 305 may receive, via the receiver module 210-*a*, and process messages from a serving base station of the cellular network including information associated with a scheduling for reporting transmit power headroom. The PHR module 305 may, based on the received message, control or otherwise manage the reporting of the transmit power headroom information to the serving base station.

The timing module 310 may manage aspects of scheduling WLAN operations based on the reporting schedule for reporting the transmit power headroom information via the cellular network. The timing module 310 may determine that WLAN operations are available, e.g., identify that information is to be communicated. The timing module 310 may communicate with the PHR module 305 to determine the schedule for reporting the transmit power headroom information via the cellular network. Accordingly, the timing module 310 may determine the schedule for communicating the information, e.g., data, discovery signal(s), association signal(s), etc., via the WLAN based on the reporting schedule. The timing module 310 may schedule the information to be communicated between reporting instances for the transmit power headroom information.

Figure 4:
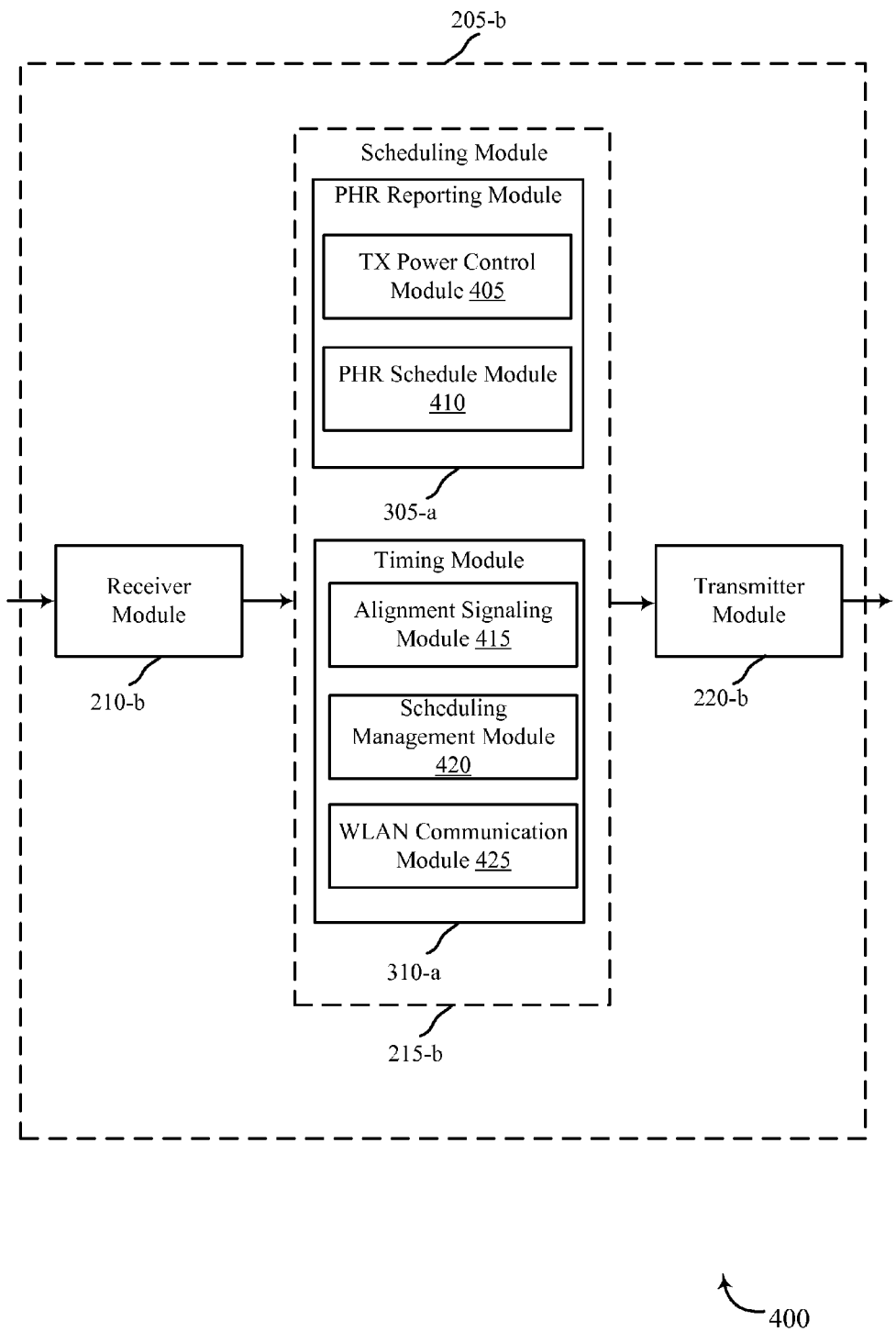
FIG. 4 shows a block diagram of a device for use in wireless communication, in accordance with various aspects of the present disclosure.

FIG. 4 shows a block diagram 400 of an apparatus 205-*b* that is used in a mobile device for wireless communication, in accordance with various examples. The apparatus 205-*b* may be an example of aspects of a mobile device 115 described with reference to FIG. 1. It may also be an example of an apparatus 205 described with reference to FIG. 2 or 3. The apparatus 205-*b* may include a receiver module 210-*b*, a scheduling module 215-*b*, and/or a transmitter module 220-*b*, which may be examples of the corresponding modules of apparatus 205. The apparatus 205-*b* may also include a processor (not shown). Each of these modules may be in communication with each other. The scheduling module 215-*b* may include a power headroom reporting (PHR) module 305-*a* and a timing module 310-*a*. The receiver module 210-*a* and the transmitter module 220-*a* may perform the functions of the receiver module 210 and the transmitter module 220 of FIG. 2, respectively.

The PHR module 305-*a* may include a transmit power control module 405 and a PHR schedule module 410 and may manage aspects of reporting transmit power headroom information for the apparatus 205-*b*. The transmit power control module 405 may, in cooperation with the transmitter module 220-*a*, control, monitor, or otherwise determine the transmit power of the apparatus 205-*b* for communications via the WLAN and/or the cellular network. The transmit power control module 405 may determine the available transmit power headroom for the apparatus based on the current transmit power and a maximum transmit power the apparatus 205-*b* supports. In some examples, the transmit power control module 405 may manage, and output information indicative of, transmit power backoff operations for cellular communications to avoid interference with WLAN operations, e.g., WLAN scan operations, WLAN connection setup operations, etc. The transmit power control module 405 may manage the transmit power backoff operations based on WLAN operation interference, rather than between reporting instances for the transmit power headroom report for the cellular network. Accordingly, the base station of the cellular network may not be aware of the transmit power backoff operations until the next reporting instance. The transmit power control module 405 may output information indicative of the backoff power operations, the transmit power for WLAN operations, and/or the transmit power for cellular communications, for example, to be included in the reporting instances to the base station.

The PHR schedule module 410 may receive, via the receiver module 210-*b*, and process messages from a serving base station of the cellular network including information associated with a scheduling for reporting transmit power headroom. The PHR schedule module 410 may communicate with the transmit power control module 405 and receive information indicative of transmit power for WLAN and cellular communications as well as an indicator of transmit power backoff operations. The PHR schedule module 410 may control or otherwise manage the reporting of the transmit power headroom information to the serving base station. For example, the PHR schedule module 410 may receive the information from the transmit power control module 405 and generate a power headroom report to be sent, via the transmitter module 220-*b*, to the serving base station of the cellular network according to the PHR scheduling information received from the serving base station.

The timing module 310-*a* may include an alignment signaling module 415, a scheduling management module 420, and a WLAN communication module 425 and may manage aspects of scheduling WLAN operations based on the reporting schedule for reporting the transmit power headroom information via the cellular network. The alignment signaling module 415 may manage aspects of signaling alignment operations for the apparatus 205-*b*. In some examples, the apparatus may identify information to be communicated via the WLAN based on receipt of a message from an AP of the WLAN including information indicating that the AP has WLAN operations for the apparatus 205-*b*. The alignment signaling module 415 may send a message to the AP including information indicative of the schedule for reporting PHR information to the base station of the cellular network, e.g., the reporting start time, the reporting interval, the reporting stop time, the reporting length, etc. The AP may schedule the WLAN operations based on the reporting schedule for PHR information. For example, the AP may schedule the WLAN operation (e.g., data communication, discovery signal, association signal, etc.) to occur between reporting instances of the PHR information. The AP may divide the information associated with the WLAN operation into sub-blocks of information and communicate the sub-blocks between reporting instances (transmission intervals) of the PHR information. Accordingly, the apparatus 205-*b* may receive the information via the WLAN on a schedule based on the reporting schedule for the transmit power headroom information.

In some examples, the alignment signaling module 415 may, in cooperation with the scheduling management module 420 and/or the transmitter module 220-b, send a message to a base station of the cellular network. The message may include information indicating a schedule for conducting WLAN operations. The base station may receive the WLAN operation schedule and determine a reporting schedule for the apparatus 205-b to report its transmit power headroom information. The base station may send and the apparatus 205-b may receive a message that includes the updated schedule for reporting the transmit power information to the cellular network. Accordingly, the WLAN operations may be aligned with the reporting instances for the PHR information.

The scheduling management module 420 may determine that WLAN operations are available, e.g., identify that information is to be communicated. The scheduling management module 420 may receive a message from an AP including information indicating that WLAN operations are to be performed and/or may determine that the apparatus 205-b has WLAN operations to perform. The scheduling management module 420 may communicate with the PHR schedule module 410 to determine the reporting schedule for transmit power headroom information and, based on the reporting schedule, determine a schedule for performing the WLAN operation. Example information to be communicated during WLAN operations include, but are not limited to, scanning signals, an association request message, an association response message, a request-to-send (RTS) message, a clear-to-send (CTS) message, and/or combinations thereof. The scheduling management module 420 may determine a schedule for the WLAN operations where WLAN signals are communicated between reporting instances of the PHR information. For example, when the WLAN operation involves a quantity of information that can be communicated between subsequent instances of transmit power headroom information, the scheduling management module 420 may schedule the WLAN operation to be performed between the reporting instances.

In some examples where the WLAN operation involves a quantity of information that cannot be communicated between subsequent reporting instances, the scheduling management module 420 may divide the information to be communicated into sub-blocks of information. The sub-block of information may be sized such that each sub-block can be communicated between reporting instances. Accordingly, the WLAN operations can be aligned to be performed between reporting instances for the transmit power headroom information. As discussed above, an AP of the WLAN may perform the functions of the scheduling management module 420 based on receipt of the reporting schedule for the PHR information from the apparatus 205-b.

The WLAN communication module 425 may communicate with the alignment signaling module 415 and/or the scheduling management module 420 to manage aspects of the WLAN operations for communicating WLAN signals. The WLAN communication module 425 may, in cooperation with the transmitter module 220-b, control the timing of WLAN signal transmission based on the schedule determined by the scheduling management module 420. Accordingly, the apparatus 205-b may perform the WLAN operation based on alignment with the reporting schedule for PHR information via the cellular network.

Figure 5:
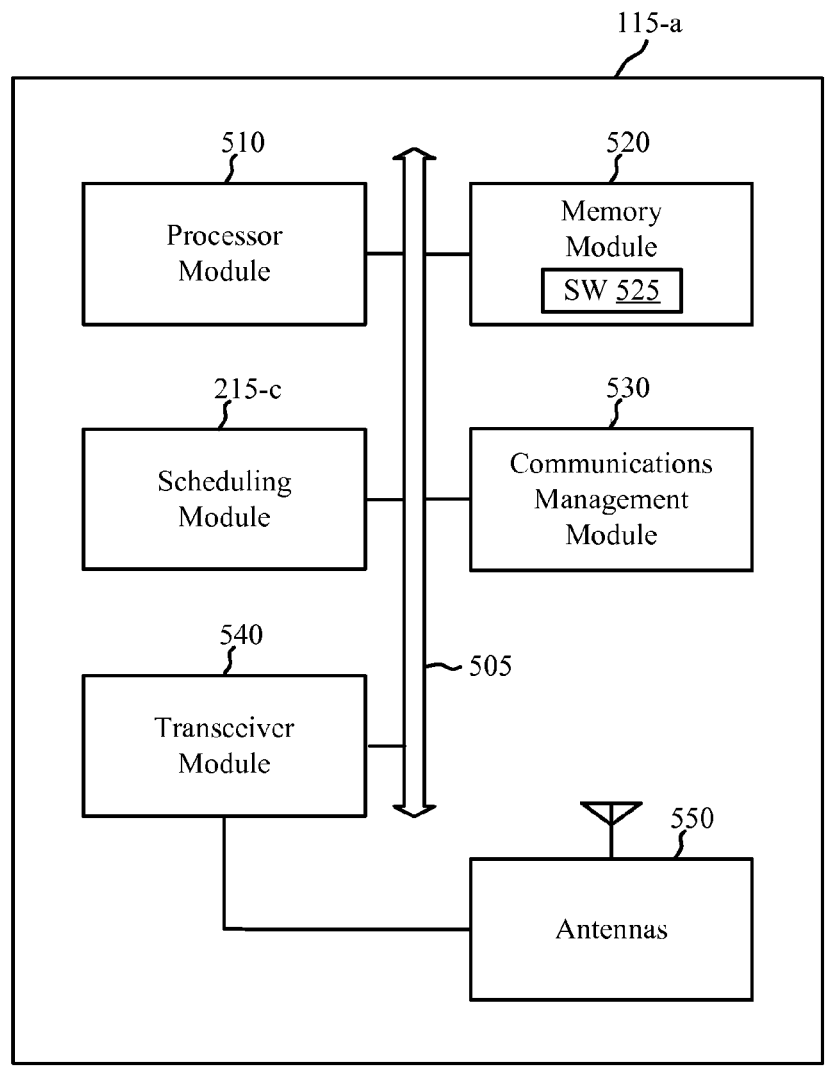
FIG. 5 shows a block diagram of a wireless communication system, in accordance with various aspects of the present disclosure.

Turning to FIG. 5, a wireless communication system 500 is shown that illustrates a mobile device 115-a that aligns WLAN operations with transmit power headroom reporting instances via the cellular network. The mobile device 115-a may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The mobile device 115-a may have an internal power supply (not shown), such as a small battery, to facilitate mobile operation. The mobile device 115-a may be an example of the mobile device 115 of FIG. 1. The mobile device 115-a may be an example of one of the apparatuses 205 of FIG. 2, 3, or 4.

The mobile device 115-a may include a processor module 510, a memory module 520, a communications management module 530, a transceiver module 540, antennas 550, and a scheduling module 215-c. The scheduling module 215-c may be an example of, and perform the functions of the scheduling module 215 of FIG. 2, 3, or 4. Each of these modules may be in communication with each other, directly or indirectly, over at least one bus 505.

The memory module 520 may include RAM and ROM. The memory module 520 may store computer-readable, computer-executable software (SW) code 525 containing instructions that, when executed, cause the processor module 510 to perform various functions described herein for aligning WLAN operations based on a PHR reporting schedule. Alternatively, the software code 525 may not be directly executable by the processor module 510 but cause the computer (e.g., when compiled and executed) to perform functions described herein.

The processor module 510 may include an intelligent hardware device, e.g., a CPU, a microcontroller, an ASIC, etc. The processor module 510 may process information received through the transceiver module 540 and/or to be sent to the transceiver module 540 for transmission through the antennas 550. The processor module 510 may handle, alone or in connection with the scheduling module 215-c, various aspects for WLAN operations alignment.

The transceiver module 540 may communicate bi-directionally with APs 110 and/or base stations 105 in FIG. 1. The transceiver module 540 may be implemented as at least one transmitter module and at least one separate receiver module. The transceiver module 540 may include a modem to modulate the packets and provide the modulated packets to the antennas 550 for transmission, and to demodulate packets received from the antennas 550. While the mobile device 115-a may include a single antenna, there may be aspects in which the mobile device 115-a may include multiple antennas 550.

According to the architecture of FIG. 5, the mobile device 115-a may further include a communications management module 530. The communications management module 530 may manage communications with various access points of a WLAN and/or with base stations of a cellular network. The communications management module 530 may be a component of the mobile device 115-a in communication with some or all of the other components of the mobile device 115-a over the at least one bus 505. Alternatively, functionality of the communications management module 530 may be implemented as a component of the transceiver module 540, as a computer program product, and/or as at least one controller element of the processor module 510.

The components of the mobile device 115-a may implement aspects discussed above with respect to FIG. 1, 2, 3, or 4, and those aspects may not be repeated here for the sake of brevity. Moreover, the components of the mobile device 115-a may implement aspects discussed below with respect to FIG. 1, 2, 3, or 4, and those aspects may not be repeated here also for the sake of brevity.

Figure 6:
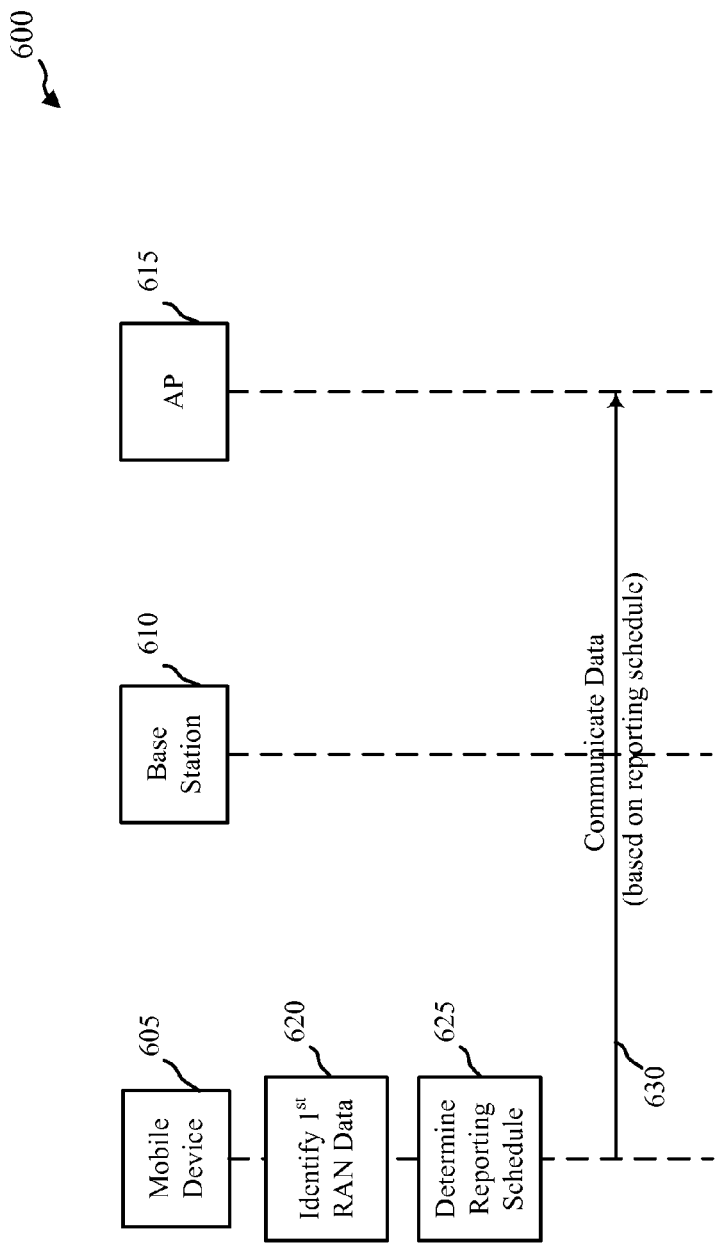
FIG. 6 shows a swim lane diagram illustrating aspects of wireless communications, in accordance with various aspects of the present disclosure.

FIG. 6 is a swim diagram 600 illustrating aspects of WLAN operations alignment, in accordance with various aspects of the present disclosure. The diagram 600 may illustrate aspects of the wireless communication system 100 and/or 500 described with reference to FIG. 1 or 5, respectively. The diagram 600 includes a mobile device 605, a base station 610, and an AP 615. The mobile device 605 may be an example of at least one of the mobile devices 115 and/or apparatuses 205 described above with respect to FIGS. 1, 2, 3, 4, and/or 5. The base station 610 may be an example of at least one of the base stations 105 described above with respect to FIG. 1. The AP may be an example of at least one of the APs 110 described above with respect to FIG. 1. Generally, the diagram 600 illustrates aspects of implementing WLAN operation alignment based on a reporting schedule for PHR information. In some examples, a system device, such as one of the mobile devices 115, apparatuses 205, base stations 105, and/or APs 110 may execute sets of codes to control the functional elements of the device to perform some or all of the functions described below.

At block 620, the mobile device 605 may identify that information (e.g., data) is to be communicated via a first RAN. The first RAN may correspond to WLAN communications with the AP 615. In some examples, the mobile device 605 may identify the information to be communicated based on receipt of an indication for a WLAN operation from an application, protocol, etc., on the mobile device 605. At block 625, the mobile device 605 may determine a reporting schedule for transmit power headroom information to the base station 610. The reporting schedule may be signaled from the base station 610 and stored in a memory of the mobile device 605. The reporting schedule may have a reporting start time, a reporting stop time, a reporting length, a reporting periodicity, etc.

At 630, the mobile device 605 may communicate with the AP 615 per a schedule based on the reporting schedule. The mobile device 605 may align the WLAN operations (e.g., WLAN data communications) with the reporting instances for WLAN operations. Accordingly, the mobile device 605 may perform the WLAN operations and communicate with the base station 610 over a cellular network with known power levels. Known power levels for WLAN operations and/or cellular communications may provide for more reliable communications via appropriate modulation and coding scheme selection.

Figure 7:
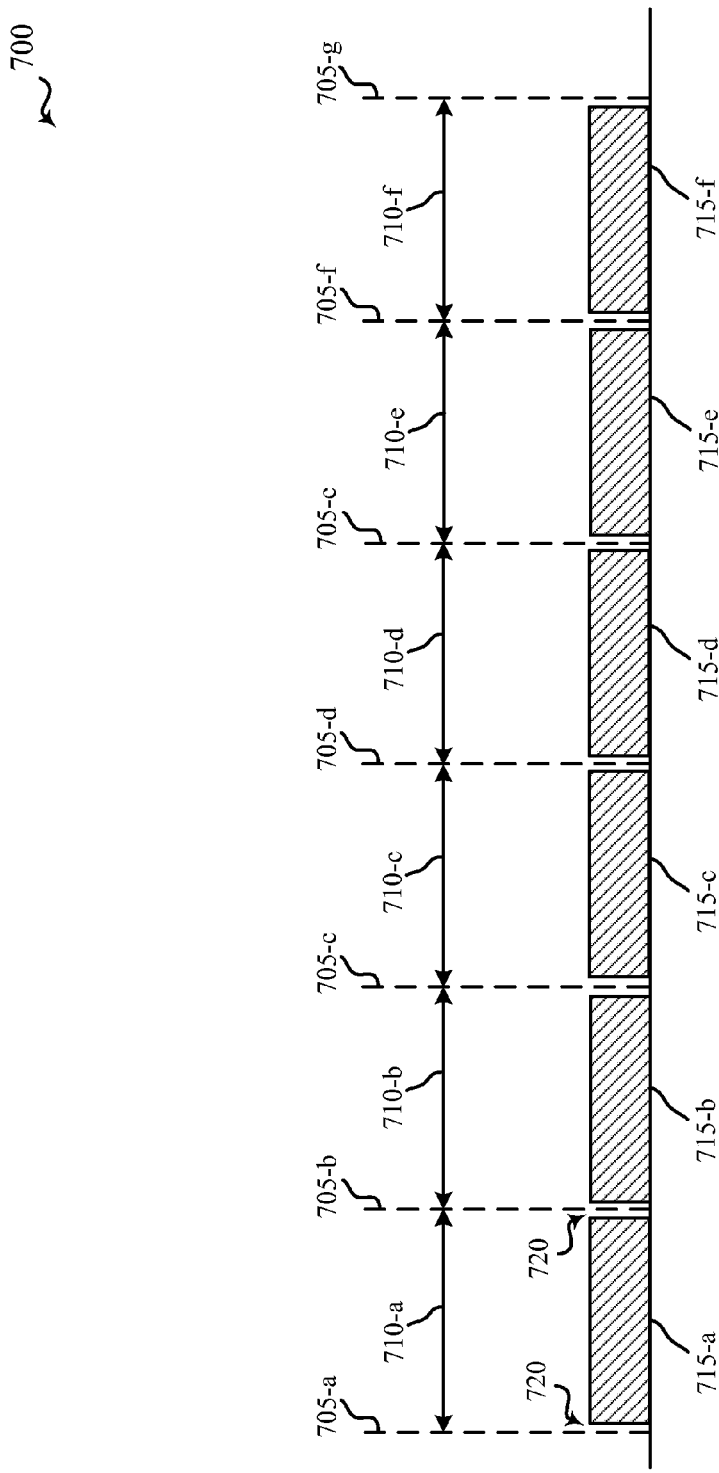
FIG. 7 shows a timing diagram illustrating alignment operations for wireless communications, in accordance with various aspects of the present disclosure.

FIG. 7 is a timing diagram 700 illustrating aspects of WLAN operations alignment, in accordance with various aspects of the present disclosure. The diagram 700 may illustrate aspects of the wireless communication system 100 and/or 500 described with reference to FIG. 1 or 5, respectively. The diagram may be implemented by at least one of the mobile devices 115, apparatuses 205, base stations 105, and/or APs 110 described above with respect to FIGS. 1, 2, 3, 4, 5, and/or 6.

As discussed, various aspects of the present disclosure provide for aligning WLAN operations with reporting instances of transmit power headroom information via a cellular network. As illustrated in FIG. 7, a mobile device may send transmit power headroom information on a recurring schedule. Each transmission may be a PHR transmission instance 705 (e.g., PHR transmission instances 705-*a*, 705-*b*, etc.). The period between subsequent PHR transmission instances 705 may be a transmission interval 710 (e.g., transmission intervals 710-*a*, 710-*b*, etc.). In accordance with the present disclosure, a mobile device may schedule WLAN operations to be performed during the transmission interval 710, i.e., between subsequent instances of the PHR transmission instances 705. For example, the mobile device may schedule the communication of WLAN signals 715 (e.g., WLAN signals 715-*a*, 715-*b*, etc.) based on the schedule for the PHR transmission instances 705. When the WLAN signal 715 is small enough, it can be communicated between two PHR transmission instances 705. Otherwise, the mobile device may subdivide the WLAN signal 715 into sub-blocks (e.g., multiple WLAN signals 715) to be communicated between the PHR transmission instances 705. In some examples, the mobile device may schedule the WLAN operations such that the WLAN signals 715 include a gap 720 on the leading and/or trailing edge. That is, the mobile device may schedule a pause (represented as the gap 720) between a PHR transmission instance 705 and the start of the transmission of the WLAN signal 715. Similarly, the mobile device may schedule a pause between the completion of the transmission of the WLAN signal 715 and the next PHR transmission instance 705. In some examples, the mobile device may start backing off its transmit power for cellular communications (as indicated in the PHR transmission instance 705) during the gap 720 for WLAN operations.

Figure 8:
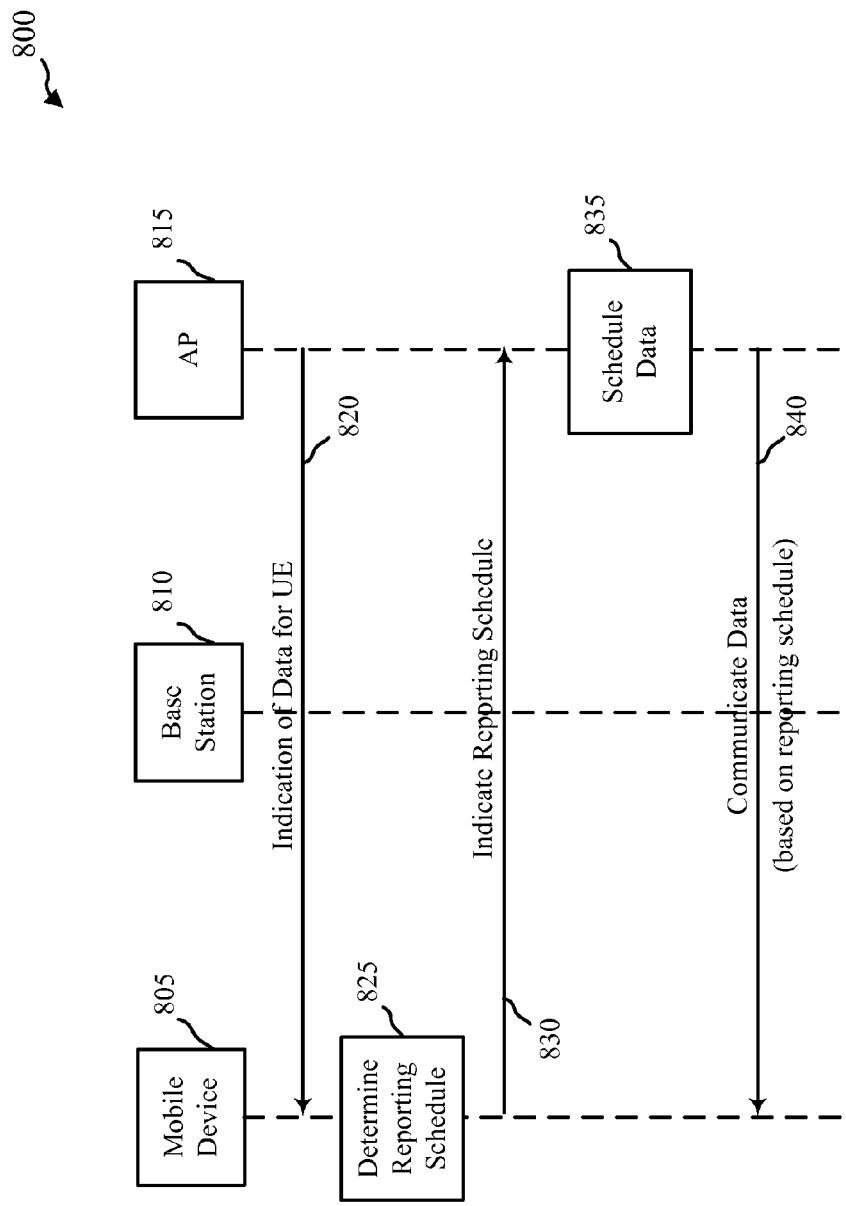
FIG. 8 shows a swim lane diagram illustrating aspects of wireless communications, in accordance with various aspects of the present disclosure.

FIG. 8 is a swim diagram 800 illustrating aspects of WLAN operations alignment, in accordance with various aspects of the present disclosure. The diagram 800 may illustrate aspects of the wireless communication system 100 and/or 500 described with reference to FIG. 1 or 5, respectively. The diagram 800 includes a mobile device 805, a base station 810, and an AP 815. The mobile device 805 may be an example of at least one of the mobile devices 115 and/or apparatuses 205 described above with respect to FIGS. 1, 2, 3, 4, and/or 5. The base station 810 may be an example of at least one of the base stations 105 described above with respect to FIG. 1. The AP 815 may be an example of at least one of the APs 110 described above with respect to FIG. 1. Generally, the diagram 800 illustrates aspects of implementing WLAN operation alignment based on a reporting schedule for PHR information. In some examples, a system device, such as one of the mobile devices 115, apparatuses 205, base stations 105, and/or APs 110 may execute sets of codes to control the functional elements of the device to perform some or all of the functions described below.

At 820, the AP 815 may send a signal to the mobile device 805 including information indicating that WLAN operations are to be performed (e.g., that data is to be communicated). Example WLAN operations may include data to communicate, discovery signaling, association signaling, etc. At block 825, the mobile device 805 may determine a reporting schedule for transmit power headroom information to the base station 810. The reporting schedule may be signaled from the base station 810 and stored in a memory of the mobile device 805. At 830, the mobile device 805 may send a message to the AP 815 including information indicating the reporting schedule for PHR information. The message may include information associated with the reporting schedule, e.g., a reporting start time, a reporting stop time, a reporting length, a reporting periodicity, etc.

At block 835, the AP 815 may determine a schedule for WLAN communications to align the WLAN operations (e.g., WLAN data communications) with the reporting instances for WLAN operations, as indicated in the PHR schedule. Accordingly, the AP 815 may perform the WLAN operations and communicate with the mobile device 805 over the WLAN at 840.

Figure 9:
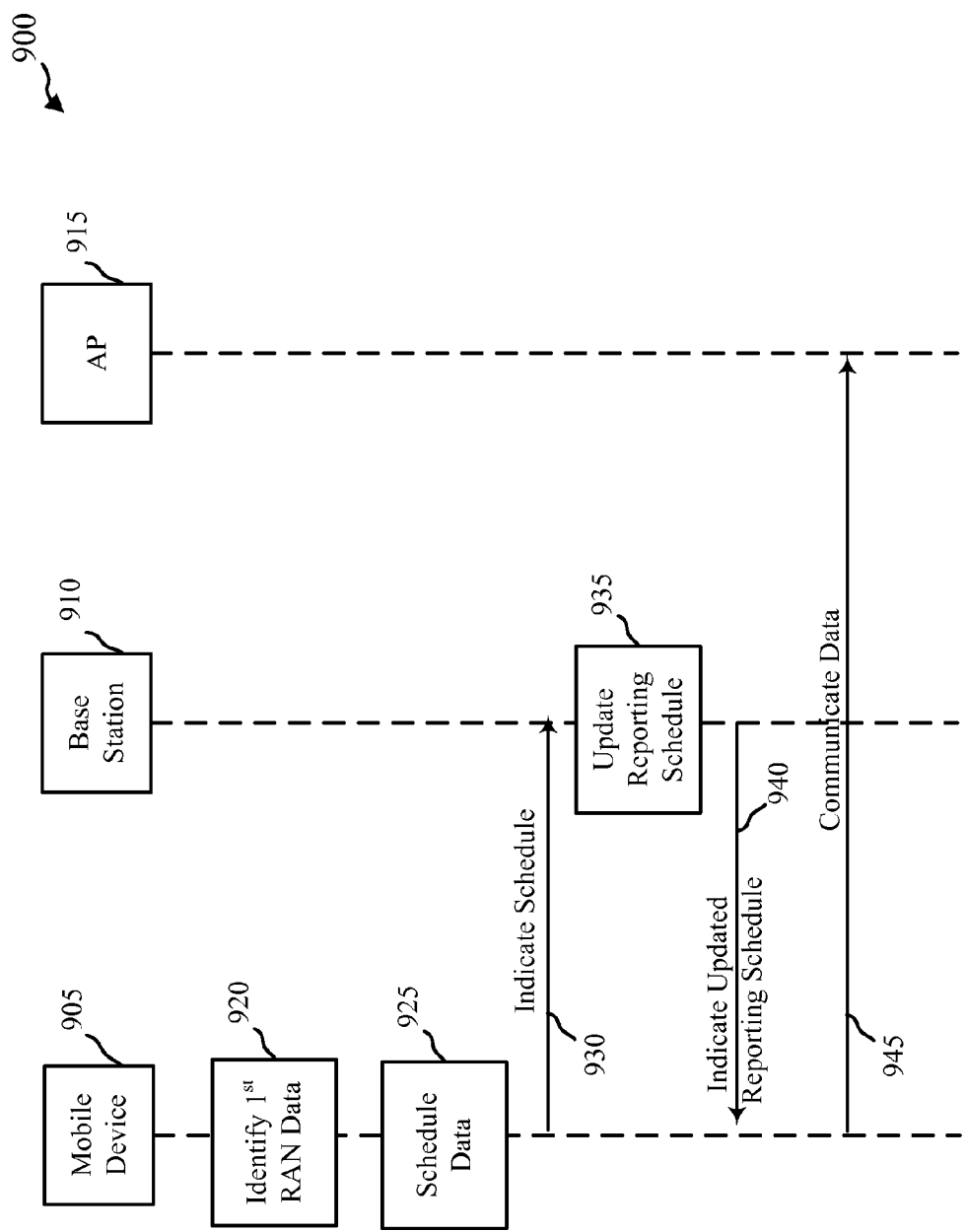
FIG. 9 shows a swim lane diagram illustrating aspects of wireless communications, in accordance with various aspects of the present disclosure.

FIG. 9 is a swim diagram 900 illustrating aspects of WLAN operations alignment, in accordance with various aspects of the present disclosure. The diagram 900 may illustrate aspects of the wireless communication system 100 and/or 500 described with reference to FIG. 1 or 5, respectively. The diagram 900 includes a mobile device 905, a base station 910, and an AP 915. The mobile device 905 may be an example of at least one of the mobile devices 115 and/or apparatuses 205 described above with respect to FIGS. 1, 2, 3, 4, and/or 5. The base station 910 may be an example of at least one of the base stations 105 described above with respect to FIG. 1. The AP 915 may be an example of at least one of the APs 110 described above with respect to FIG. 1. Generally, the diagram 900 illustrates aspects of implementing WLAN operation alignment based on a reporting schedule for PHR information. In some examples, a system device, such as one of the mobile devices 115, apparatuses 205, base stations 105, and/or APs 110 may execute sets of codes to control the functional elements of the device to perform some or all of the functions described below.

At block 920, the mobile device 905 may identify that information (e.g., data) is to be communicated via a first RAN. The first RAN may correspond to WLAN communications with the AP 915. In some examples, the mobile device 905 may identify the information to be communicated based on receipt of an indication for a WLAN operation from an application, protocol, etc., on the mobile device 905. At block 925, the mobile device 905 may determine a schedule for communicating the WLAN information. In the example illustrated in FIG. 9, however, the mobile device 905 may determine a schedule to communicate for the WLAN operations that is not based on the PHR transmission instances (due to a WLAN conflict, for example). Instead, at 930 the mobile device 905 may send a message to the base station 910 that includes information indicative of the WLAN schedule. At block 935, the base stations 910 may update the schedule for reporting transmit power headroom information for the mobile device 905 and send the updated reporting schedule to the mobile device 905 at 940. The updated reporting schedule may be aligned with the WLAN operations, e.g., the reporting instances are scheduled to occur between transmission intervals for sub-blocks of WLAN communications. At 945, the mobile device 905 may communicate with the AP 915 per the schedule.

Figure 10:
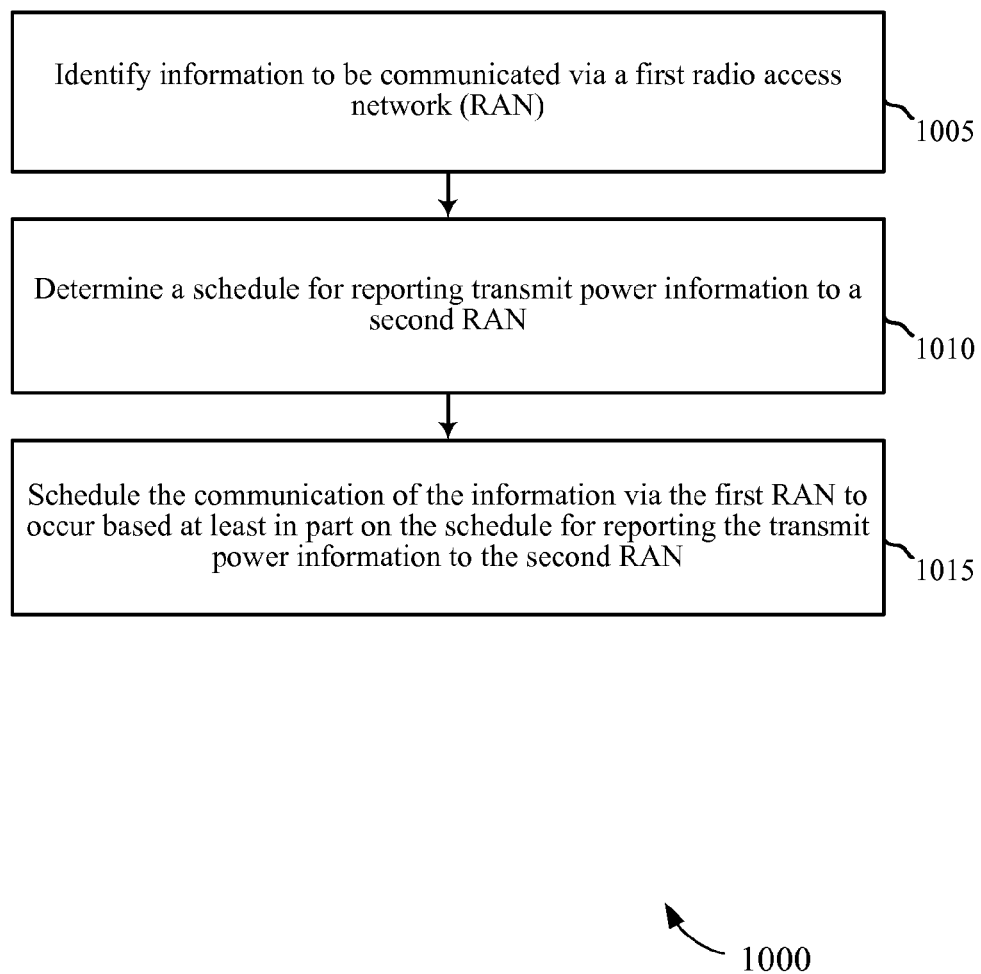
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of at least one of the mobile devices 115 and/or apparatuses 205 described with reference to FIGS. 1, 2, 3, 4, 5, 6, 7, 8, and/or 9. In some examples, a mobile device may execute sets of codes to control the functional elements of the mobile device to perform the functions described below. Additionally or alternatively, the mobile device may perform at least one of the functions described below using multi-purpose hardware.

At block 1005, the method 1000 may include identifying information to be communicated via a first RAN, e.g., a WLAN. The information may be associated with at least one WLAN operation, e.g., discovery, association, data communication, etc. A mobile device may identify that information is to be communicated based on an application, protocol, etc., on the mobile device. At block 1010, a schedule may be determined for reporting transmit power information to a second RAN, e.g., a cellular network. The reporting schedule may be determined and communicated to the mobile device from a serving base stations of the cellular network. The transmit power information may be a PHR.

At block 1015, a schedule for communicating the information via the first RAN may be determined. The information may be scheduled to be communicated based on the schedule for reporting the transmit power information to the second RAN. For example, the schedule may provide for communicating the information between subsequent reporting instances of the transmit power information.

The operation(s) at blocks 1005, 1010, and/or 1015 may be performed using the scheduling module 215 described with reference to FIG. 2, 3, 4, or 5.

Thus, the method 1000 may provide for wireless communication. It should be noted that the method 1000 is just one implementation and that the operations of the method 1000 may be rearranged or otherwise modified such that other implementations are possible.

Figure 11:
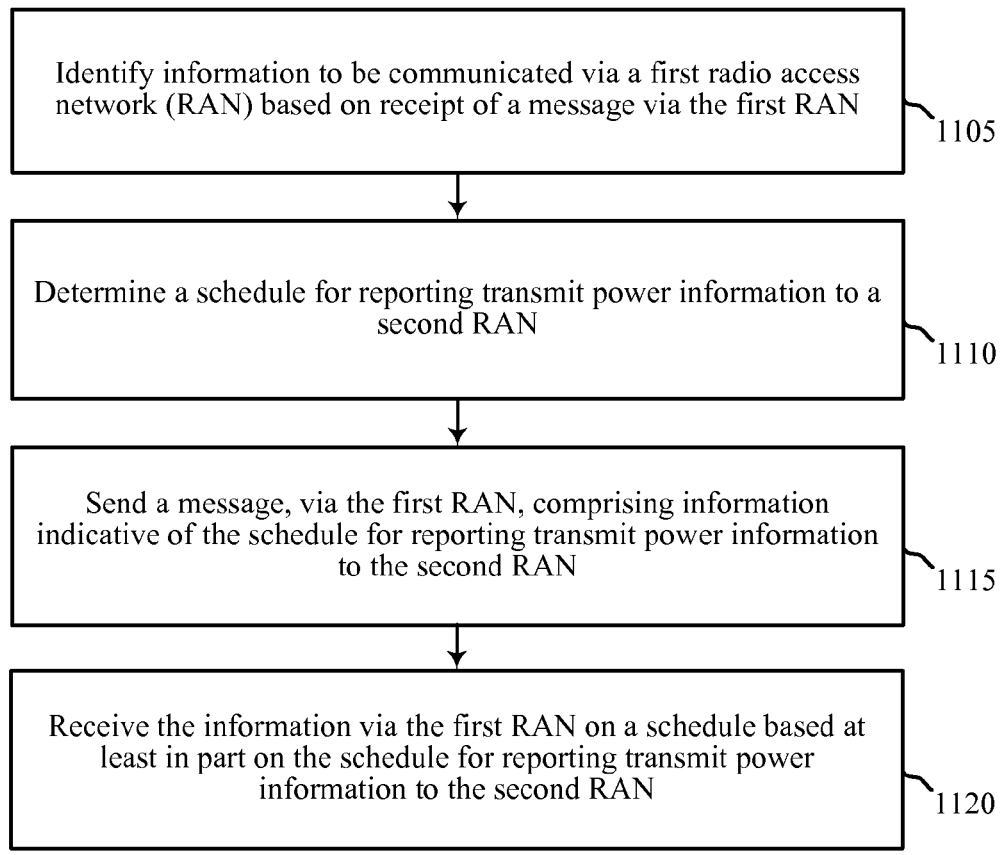
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of at least one of the mobile devices 115, apparatuses 205, and/or APs 110 described with reference to FIGS. 1, 2, 3, 4, 5, 6, 7, 8, and/or 9. In some examples, a mobile device and/or an AP may execute sets of codes to control the functional elements of the mobile device to perform the functions described below. Additionally or alternatively, the mobile device and/or the AP may perform at least one of the functions described below using multi-purpose hardware.

At block 1105, the method 1100 may include identifying information to be communicated via a first RAN, e.g., a WLAN, based on receipt of a message via the first RAN. The information may be associated with at least one WLAN operation, e.g., discovery, association, data communication, etc. At block 1110, a schedule may be determined for reporting transmit power information to a second RAN, e.g., a cellular network. The reporting schedule may be determined and communicated to the mobile device from a serving base stations of the cellular network. The transmit power information may be a PHR.

At block 1115, the mobile device may send a message via the first RAN that includes information indicating the schedule for reporting the transmit power information to the second RAN. The AP may receive the message and schedule communications for the WLAN operations to align the WLAN communications with the reporting instances for the transmit power information. At block 1120, the information may be received via the first RAN on a schedule based on the schedule for communicating the transmit power information via the second RAN. For example, the schedule may provide for receiving the information between subsequent reporting instances of the transmit power information.

The operation(s) at blocks 1105, 1110, 1115, and/or 1120 may be performed using the scheduling module 215 described with reference to FIG. 2, 3, 4, or 5.

Thus, the method 1100 may provide for wireless communication. It should be noted that the method 1100 is just one implementation and that the operations of the method 1100 may be rearranged or otherwise modified such that other implementations are possible.

In some examples, aspects from the methods 1000 and 1100 may be combined. It should be noted that the methods 1000 and 1100 are just example implementations, and that the operations of the methods 1000-1100 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   identifying information to be communicated via a first radio access network (RAN);
   determining a schedule for reporting transmit power information to a second RAN, the transmit power information based at least in part on whether information is to be communicated via the first RAN; and
   scheduling the communication of the information via the first RAN to occur based at least in part on the schedule for reporting the transmit power information to the second RAN.

2. The method of claim 1, further comprising:
   scheduling the communication of the information via the first RAN to occur between subsequent instances of reporting the transmit power information to the second RAN.

3. The method of claim 1, further comprising:
   dividing the information to be communicated via the first RAN into at least one communication sub-block; and
   scheduling the communication of the at least one communication sub-block to occur between subsequent instances of reporting the transmit power information to the second RAN.

4. The method of claim 1, further comprising:
   receiving an indication via the first RAN that information is to be communicated;
   sending a message, via the first RAN, comprising information indicative of the schedule for reporting transmit power information to the second RAN; and
   receiving the information via the first RAN on a schedule based at least in part on the schedule for reporting transmit power information to the second RAN.

5. The method of claim 4, wherein the information indicative of the schedule for reporting transmit power information to the second RAN comprises at least one of a reporting start time, a reporting interval, or combinations thereof.

6. The method of claim 1, further comprising:
receiving an indication via the first RAN that information is to be communicated;
sending a message, via the first RAN, comprising information indicative of the schedule for reporting transmit power information to the second RAN; and
receiving the information, via the first RAN, during at least one communication interval, wherein the at least one communication interval is based at least in part on the schedule for reporting transmit power information to the second RAN.

7. The method of claim 1, further comprising:
sending a message via the second RAN, the message comprising information indicative of a schedule for communicating the information via the first RAN; and
receiving, via the second RAN, an updated schedule for reporting the transmit power information to the second RAN, wherein the updated schedule is based at least in part on the schedule for communicating the information via the first RAN.

8. The method of claim 1, wherein the first RAN is a wireless local area network (WLAN) and the second RAN is a cellular communications network.

9. The method of claim 1, wherein the transmit power information is reported to the second RAN in a power headroom report.

10. The method of claim 9, wherein the transmit power information reported to the second RAN comprises at least one of a transmit power associated with communications via the first RAN, a transmit power associated with communications via the second RAN, or combinations thereof.

11. The method of claim 9, wherein the power headroom report comprises a power backoff indicator.

12. The method of claim 1, wherein the information to be communicated via the first RAN comprises at least one of an information associated with a scan interval, an association request message, an association response message, data to be transmitted, or combinations thereof.

13. An apparatus for wireless communications, comprising:
a processor;
memory in electronic communication with the processor; and
instructions being stored in the memory, the instructions being executable by the processor to:
identify information to be communicated via a first radio access network (RAN);
determine a schedule for reporting transmit power information to a second RAN, the transmit power information based at least in part on whether information is to be communicated via the first RAN; and
schedule the communication of the information via the first RAN to occur based at least in part on the schedule for reporting the transmit power information to the second RAN.

14. The apparatus of claim 13, further comprising instructions executable by the processor to:
schedule the communication of the information via the first RAN to occur between subsequent instances of reporting the transmit power information to the second RAN.

15. The apparatus of claim 13, further comprising instructions executable by the processor to:
divide the information to be communicated via the first RAN into at least one communication sub-block; and
schedule the communication of the at least one communication sub-block to occur between subsequent instances of reporting the transmit power information to the second RAN.

16. The apparatus of claim 13, further comprising instructions executable by the processor to:
receive an indication via the first RAN that information is to be communicated;
send a message, via the first RAN, comprising information indicative of the schedule for reporting transmit power information to the second RAN; and
receive the information via the first RAN on a schedule based at least in part on the schedule for reporting transmit power information to the second RAN.

17. The apparatus of claim 16, wherein the information indicative of the schedule for reporting transmit power information to the second RAN comprises at least one of a reporting start time, a reporting interval, or combinations thereof.

18. The apparatus of claim 13, further comprising instructions executable by the processor to:
receive an indication via the first RAN that information is to be communicated;
send a message, via the first RAN, comprising information indicative of the schedule for reporting transmit power information to the second RAN; and
receive the information, via the first RAN, during at least one communication interval, wherein the at least one communication interval is based at least in part on the schedule for reporting transmit power information to the second RAN.

19. The apparatus of claim 13, further comprising instructions executable by the processor to:
send a message via the second RAN, the message comprising information indicative of a schedule for communicating the information via the first RAN; and
receive, via the second RAN, an updated schedule for reporting the transmit power information to the second RAN, wherein the updated schedule is based at least in part on the schedule for communicating the information via the first RAN.

20. The apparatus of claim 13, wherein the first RAN is a wireless local area network (WLAN) and the second RAN is a cellular communications network.

21. The apparatus of claim 13, wherein the transmit power information is reported to the second RAN in a power headroom report.

22. The apparatus of claim 21, wherein the transmit power information reported to the second RAN comprises at least one of a transmit power associated with communications via the first RAN, a transmit power associated with communications via the second RAN, or combinations thereof.

23. The apparatus of claim 21, wherein the power headroom report comprises a power backoff indicator.

24. The apparatus of claim 13, wherein the information to be communicated via the first RAN comprises at least one of an information associated with a scan interval, an association request message, an association response message, data to be transmitted, or combinations thereof.

25. An apparatus for wireless communications, comprising:
means for identifying information to be communicated via a first radio access network (RAN);
means for determining a schedule for reporting transmit power information to a second RAN, the transmit power information based at least in part on whether information is to be communicated via the first RAN; and means for scheduling the communication of the information via the first RAN to occur based at least in part on the schedule for reporting the transmit power information to the second RAN.

26. The apparatus of claim 25, further comprising:

means for scheduling the communication of the information via the first RAN to occur between subsequent instances of reporting the transmit power information to the second RAN.

27. The apparatus of claim 25, further comprising:

means for dividing the information to be communicated via the first RAN into at least one communication sub-block; and means for scheduling the communication of the at least one communication sub-block to occur between subsequent instances of reporting the transmit power information to the second RAN.

28. The apparatus of claim 25, further comprising:

means for receiving an indication via the first RAN that information is to be communicated;

means for sending a message, via the first RAN, comprising information indicative of the schedule for reporting transmit power information to the second RAN; and means for receiving the information via the first RAN on a schedule based at least in part on the schedule for reporting transmit power information to the second RAN.

29. A non-transitory computer-readable medium storing computer executable code for wireless communications, the code executable by a processor to:

identify information to be communicated via a first radio access network (RAN);

determine a schedule for reporting transmit power information to a second RAN, the transmit power information based at least in part on whether information is to be communicated via the first RAN; and schedule the communication of the information via the first RAN to occur based at least in part on the schedule for reporting the transmit power information to the second RAN.

30. The non-transitory computer-readable medium of claim 29, further comprising code executable by the processor to:

schedule the communication of the information via the first RAN to occur between subsequent instances of reporting the transmit power information to the second RAN.

* * * * *